June 28, 1932.  E. N. WESTRUM  1,864,876
LOAD INDICATING GAUGE FOR VEHICLES
Filed Jan. 29, 1931  4 Sheets-Sheet 1
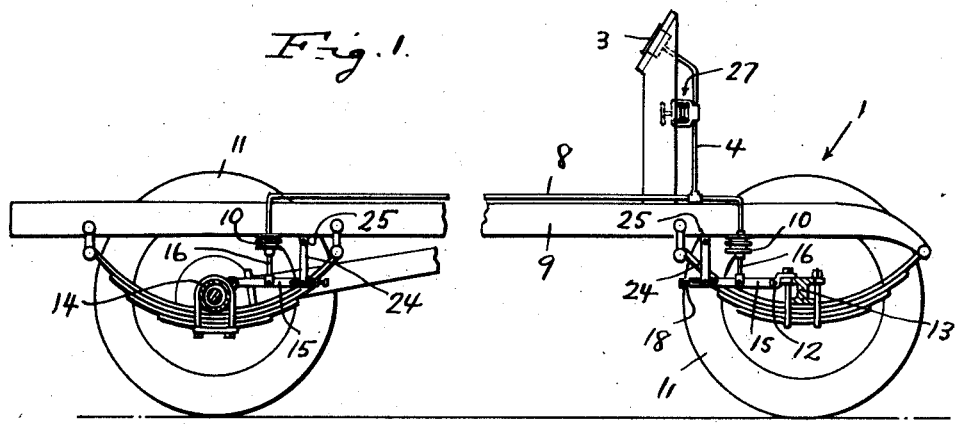
Inventor
*Eldon N. Westrum*
By *Clarence A. O'Brien*
Attorney June 28, 1932.  E. N. WESTRUM  1,864,876
LOAD INDICATING GAUGE FOR VEHICLES
Filed Jan. 29, 1931   4 Sheets-Sheet 2

Inventor
Eldon N. Westrum
By *Clarence A. O'Brien*
Attorney

June 28, 1932.  E. N. WESTRUM  1,864,876
LOAD INDICATING GAUGE FOR VEHICLES
Filed Jan. 29, 1931    4 Sheets-Sheet 3
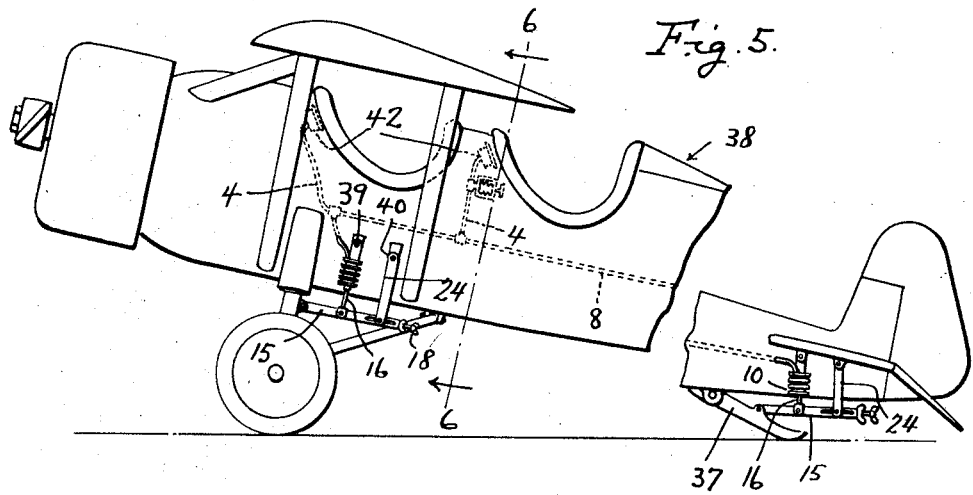
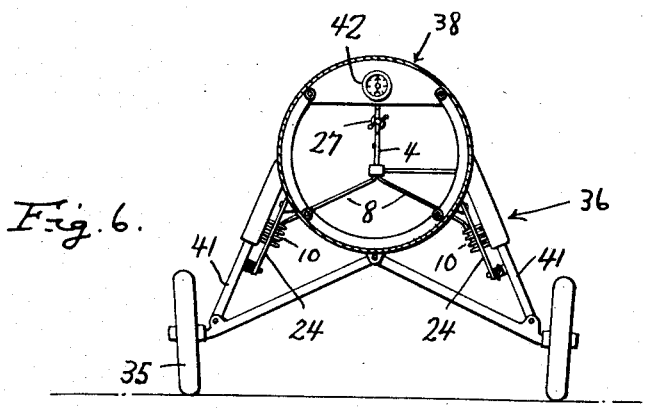
Inventor
Eldon N. Westrum
By Clarence A. O'Brien
Attorney June 28, 1932.  E. N. WESTRUM  1,864,876
LOAD INDICATING GAUGE FOR VEHICLES
Filed Jan. 29, 1931  4 Sheets-Sheet 4

Inventor

Eldon N. Westrum

By Clarence A. O'Brien
Attorney

Patented June 28, 1932

1,864,876

UNITED STATES PATENT OFFICE

ELDON N. WESTRUM, OF AMES, IOWA

LOAD INDICATING GAUGE FOR VEHICLES

Application filed January 29, 1931. Serial No. 512,117.

The present invention relates generally to new and useful improvements in the load indicating gauge for vehicles and more particularly for use on automobiles and aeroplanes, but it is understood, of course, that a device in accordance with this invention may be used for any purpose and on any type of vehicles for which the same may be found adapted and desirable.

An important object of the invention is to provide, in a manner as hereinafter set forth, a fluid actuated gauge of the aforementioned character for use on vehicles embodying means for expeditiously regulating the fluid pressure therein to assure accuracy when installed on different vehicles.

Another important object of the invention is to provide a load indicating gauge for vehicles of the character described including lever actuated bellows for operating an indicating gauge which is located within the view of the operator of the vehicle, the invention further including novel means for adjusting the levers for use on different vehicles and under varying conditions.

Other objects of the invention are to provide a load indicating gauge for vehicles which will be simple in construction, strong, durable, efficient and reliable in operation and which may be manufactured and installed on vehicles at low cost and without the necessity of materially altering said vehicles structurally.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in vertical longitudinal section through an automobile chassis showing a device in accordance with this invention mounted in position for operation thereon.

Figure 2 is a view in top plan thereof.

Figure 5 is a view in side elevation showing the invention installed for use on an aeroplane.

Figure 6 is a vertical cross sectional view through the aeroplane taken substantially on the line 6—6 of Figure 5 looking in the direction indicated by the arrows.

Figure 3:
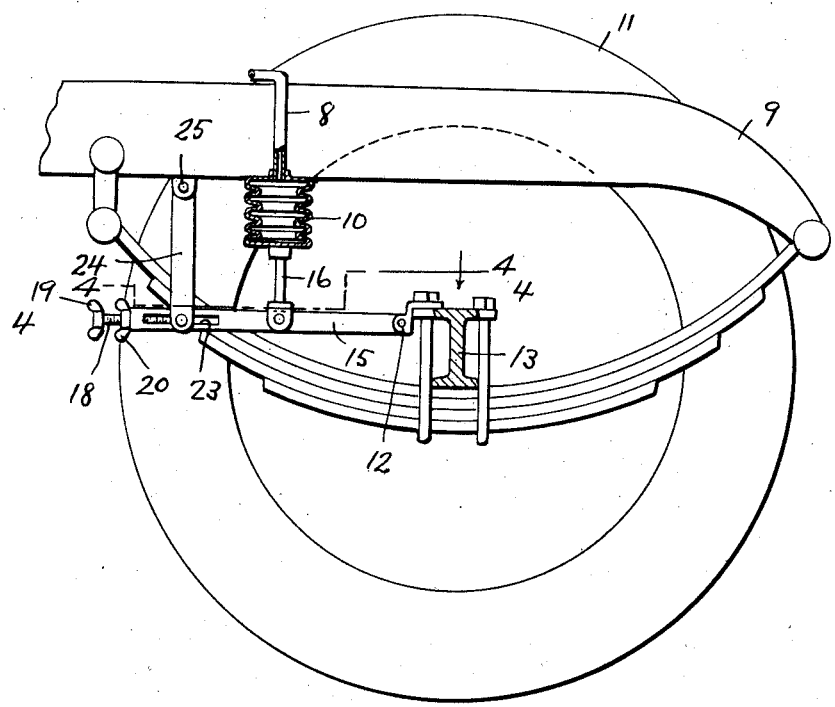
Figure 3 is a detail view principally in side elevation and partly in section of a portion of the device.

Referring to the drawings in detail, it will be seen that the reference numeral 1 designates generally the chassis of an automobile and 2 is the instrument board or panel of said automobile. Mounted on the instrument board or panel 2 is a fluid pressure responsive gauge 3 of any suitable type from which the pipe 4 extends. At its lower end the pipe 4 is connected by a T-coupling 5 to the branches 6 which, in turn, are connected by the T-couplings 7 (see Figure 2) to the branches 8 which extend longitudinally of the chassis frame 9 and terminate in downturned end portions which are connected to the upper ends of the bellows 10 which are mounted in any suitable manner on the chassis frame 9 adjacent each of the wheels 11.

Hingedly connected as at 12 to the front and rear axles 13 and 14, respectively, of the automobile and adjacent each of the wheels 11 is a lever 15 which extends for swinging movement in a vertical plane beneath each of the adjacent bellows 10. Rods 16 operatively connect intermediate portions of the levers 15 with the lower ends of the bellows 10, the rods 16 being pivotally connected to the levers 15.

Figure 4:
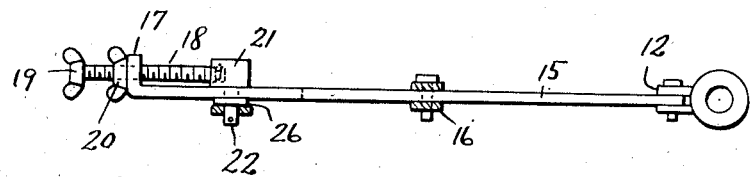
Figure 4 is a horizontal sectional view taken substantially on the line 4—4 of Figure 3.
Figure 7:
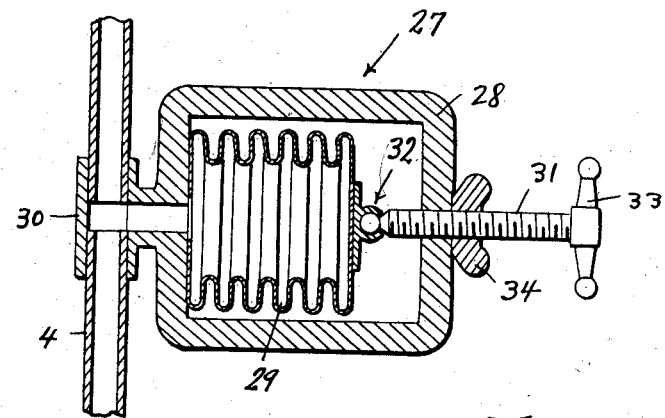
Figure 7 is a detail view in vertical longitudinal section through the fluid pressure regulating unit.
Figure 8:
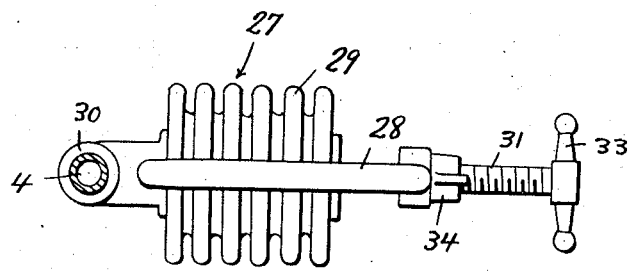
Figure 8 is a detail view in top plan of the fluid pressure regulating unit.

Each of the levers 15 terminates in a right angularly disposed free end portion 17 having a threaded opening therein in which a screw 18 is longitudinally adjustable, said screw 18 having a winged head 19 on one end for manually rotating the screw, as will be apparent. A winged lock nut 20 is threaded on each of the screws 18 for engagement with the angular end portion 17 in a manner to secure the respective screws in adjusted position. The other end of each of the screws 18 is swivelly connected with a block 21 having a pin 22 projecting laterally from one side thereof and operable in a slot 23 which extends longitudinally in the free end portion of each of the levers 15. A link 24 has its upper end pivotally connected to the frame 9 adjacent each of the bellows 10 as at 25 and its lower end journaled on the adjacent pin 22, a washer 26 being interposed between said link and the adjacent lever 15. As best seen in Figure 4 of the drawings, the free end portions of each of the pins 22 is provided with a transverse opening for receiving a cotter pin for retaining the links 24 thereon.

Interposed in the pipe 4 is a pressure regulating unit which is designated generally by the reference numeral 27 and said pressure regulating unit comprises a substantially rectangular frame 28 having mounted therein and on one end thereof a bellows 29 having communication with a T-coupling 30 which is formed integrally on said one end of the frame 28. As clearly seen in Figure 4 of the drawings, the branches of the T-coupling 30 receive the sections of the pipe 4 which are provided when said pipe 4 is severed to receive the pressure regulating unit. A rod 31 is threaded for adjustment through the opposite end of the rectangular frame 28 and is swivelly connected to the adjacent free end of the bellows 29 by a ball and socket joint 32. Operating means 33 is provided on the outer end of the threaded rod 31 for manually rotating said rod and a winged lock nut 34 is threaded thereon for engagement with the frame 28 for securing the rod 31 and the bellows 29 in adjusted position.

In Figures 5 and 6 of the drawings only three of the fluid actuating units are used, one adjacent each of the wheels 35 of the landing gear which is designated generally by the reference numeral 36 and one with the tail skid 37. The reference numeral 38 designates, of course, an aeroplane. The bellows 10 are connected to any stationary part of the aeroplane as at 39 as are also the links 24 as indicated at 40. The levers 15 are pivotally connected at one end to the lower sections 41 of the telescopic struts of the landing gears and to an intermediate portion of the tail skid 37. The fluid actuating unit which is used with the tail skid may be secured to any desired stationary part of the aeroplane, as clearly illustrated in Figure 5 of the drawings. When used in an aeroplane of the type having two cock pits, two pressure indicating gauges 42 are provided. In use, as the load in the body of the vehicle is increased, the supporting springs of the vehicle will be compressed and as the levers 15 are pivotally connected at one end to a portion of the vehicle such as the axles thereof which are not moved by the weight of the load, said levers will be actuated by the links 24 in a manner to compress or contract the bellows 10 and force the fluid therefrom through the various pipes to the gauge 3, thus actuating said gauge 3 in a manner to indicate the load on the vehicle. By actuating the screws 18 the extent of movement of the levers 15 in proportion to the movement of the body of the vehicle may be regulated as will be apparent. The regulating unit 27 provides means for setting the indicator of the gauge 3 or the gauges 42 at zero when the device is installed on different vehicles.

It is believed that the many advantages of a device in accordance with this invention will be readily understood, and although the preferred embodiment of the invention is as illustrated and described, it is to be understood that changes in the details of construction may be had which will fall within the scope of the invention as claimed.

What is claimed is:—

1. A load indicating gauge for vehicles comprising a pressure responsive gauge, bellows mounted for movement with the body of the vehicle, levers pivotally connected, at one end, with a relatively stationary portion of the vehicle, links operatively connecting the free end portions of the levers with the body for actuation thereby, rods operatively connecting the bellows with the levers for actuation thereby, and pipes connecting the bellows with the gauge.

2. A load indicating gauge for vehicles comprising a pressure responsive gauge, bellows mounted for movement with the body of the vehicle, levers pivotally connected, at one end, with a relatively stationary portion of the vehicle, fluid conducting pipes connecting the bellows with the gauge, links pivotally connected at one end with the body and pivotally and adjustably connected at their other ends with the free end portions of the levers for operatively connecting said levers to the body for actuation thereby, and rods operatively connecting the bellows to intermediate portions of the levers for actuation by said levers.

3. A load indicating gauge for vehicles comprising a pressure responsive gauge, bellows mounted for movement with the body of the vehicle, levers pivotally connected, at one end with a relatively stationary portion of the vehicle, links operatively connecting the free end portions of the levers with the body of the vehicle for actuation thereby, means operatively connecting the bellow with the levers for actuation by said levers, fluid conducting pipes connecting the bellows with the gauge and manually operable means interposed in one of the fluid conducting pipes for regulating the fluid pressure in the pipes and the bellows.

4. A load indicating gauge for vehicles comprising a pressure responsive gauge, bellows mounted for movement with the body of the vehicles, levers pivotally connected, at one end with a relatively stationary portion of the vehicle, links operatively connecting the free end portions of the levers with the body of the vehicle for actuation thereby, means operatively connecting the bellows with the levers for actuation by said levers, fluid conducting pipes connecting the bellows with the gauge and manually operable means interposed in one of the fluid conducting pipes for regulating the fluid pressure in the pipes and the bellows, the last named means comprising a frame, a T-coupling extending from the frame and interposed in said one pipe, a bellows mounted in the frame and having communication with the T-coupling, and a rod threaded for adjustment in the frame and operatively connected to the last named bellows for actuating the same.

5. A load indicating gauge for vehicles comprising a pressure responsive gauge, bellows mounted for movement with the body of the vehicles, levers pivotally connected at one end with a relatively stationary portion of the vehicle, links operatively connecting the free end portions of the levers with the body of the vehicle for actuation thereby, means operatively connecting the bellows with the levers for actuation by said levers, fluid conducting pipes connecting the bellows with the gauge and manually operable means interposed in one of the fluid conducting pipes for regulating the fluid pressure in the pipes and the bellows, the last named means comprising a substantially rectangular frame, a T-coupling formed integrally on one end of the frame and projecting therefrom and interposed in said one pipe, a bellows mounted in the frame on said one end thereof and having communication with the T-coupling, a rod threaded for adjustment in the other end of the frame and operatively connected to the last named bellows for actuating said bellows, means on one end of the rod for manually rotating the same, and means threaded on the rod and engageable with the frame for securing said rod in adjusted position.

6. A load indicating gauge for vehicles comprising a pressure responsive gauge, bellows mounted for movement with the body of the vehicle, levers pivotally connected, at one end, with a relatively stationary portion of the vehicle, pivot pins mounted for longitudinal adjustment on the free end portions of the levers, means for adjusting the pins and securing said pins in adjusted position on the levers, links journaled on the pins and pivotally connected with the body of the vehicle for actuating the levers upon movement of the body, means operatively connecting the bellows with the levers for actuation by said levers, and fluid conducting pipes connecting the bellows with the gauge.

7. A load indicating gauge for vehicles comprising a pressure responsive gauge, bellows mounted for movement with the body of the vehicle, levers pivotally connected, at one end, with a relatively stationary portion of the vehicle and having longitudinally extending slots in their free end portions, right angularly disposed extensions on said free end portions of the levers, said extensions being provided with threaded openings, screws threaded for adjustment in the openings in the extensions, blocks swivelly mounted on one end of the screws, pivot pins projecting from the blocks and operable longitudinally in the slots in the levers, links journaled at one end on the pins and having their other ends pivotally connected to the vehicle body for actuation thereby, rods operatively connecting the bellows with intermediate portions of the levers for actuation by said levers, and fluid conducting pipes connecting the bellows with the gauge.

8. A load indicating device for vehicles comprising, in combination, a pressure responsive gauge, a bellows mounted on the vehicle, means operatively connecting the gauge with the bellows, means for manually adjusting the pressure in the bellows and gauge, and means operatively connecting the bellows with a relatively movable portion of the vehicle for actuation thereby.

In testimony whereof I affix my signature.
ELDON N. WESTRUM.